Nov. 27, 1956   P. B. ALLER ET AL   2,772,374
DIFFERENTIAL SYNCHRO
Filed June 7, 1954
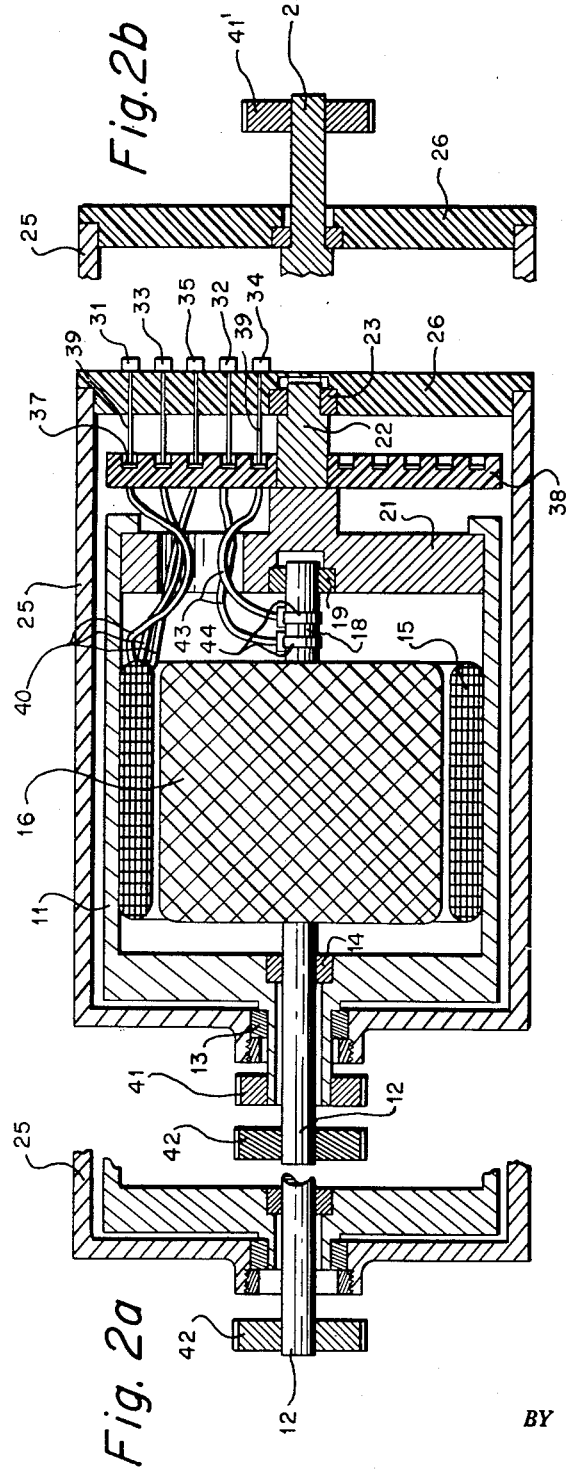
INVENTORS
PAUL B. ALLER
STUART E. HOTCHKISS
BY
K F Ross
ATTORNEYS

United States Patent Office 2,772,374
Patented Nov. 27, 1956

2,772,374

DIFFERENTIAL SYNCHRO

Paul B. Aller, Philadelphia, and Stuart E. Hotchkiss, Jenkintown, Pa.

Application June 7, 1954, Serial No. 435,100

3 Claims. (Cl. 310—115)

(Granted under Title 35, U. S. Code (1952), sec. 266)

The invention described herein may be manufactured and used by or for the Government of the United States of America for governmental purposes without the payment of any royalties thereon or therefor.

The present invention relates to a differential synchro assembly with a fully sealed case and more particularly to a differential synchro assembly having an angularly adjustable stator element in addition to a rotatably mounted rotor element both connected to externally disposed positioning means in such a way that they may be fully enclosed within a dust proof casing.

The old method of providing an angularly adjustable stator element in a differential synchro assembly involved mounting the stator element fixedly upon a rotatably supported frame member generally cylindrical in shape and provided with gear teeth around its outer periphery. In order to control the angular setting of the stator element with externally located positioning means it was necessary to provide one or more slots through the protective casing enclosing the differential synchro assembly so that an externally located gear member could project into engagement with the teeth located on the outer periphery of the frame member supporting the stator element. Such an arrangement has two inherent disadvantages. First, the necessity for providing slots in the casing means that the casing cannot be fully sealed against the entrance of foreign material such as dust. Second, the location of the gear teeth on the outer periphery of the frame member inevitably increases the space requirements for installation of this type of differential synchro because at least one gear or other positioning means must be located radially beyond the outside dimension of the casing enclosing such a differential synchro.

The present invention contemplates an improved differential synchro mechanism in which both the rotor and the frame member rotatably supporting the stator elements are connected to externally located positioning means by a pair of shaft extensions disposed either in axial alignment or concentrically of each other to project from the center of one or both ends of the casing for this differential synchro mechanism. With such an arrangement, elements engaging the respective positioning means may all be located within a relatively smaller space defined by the outer limits of the casing of this differential synchro assembly. Moreover, the shafts connecting the rotor and the stator element to their respective externally located positioning means may be passed through openings in the casing which are fully sealed against the admission of foreign material therethrough. Thus, having eliminated the need for slots in the casing, the entire casing can readily be sealed to fully enclose the elements located therein and completely exclude foreign material such as dust particles.

An object of the present invention is the provision of a differential synchro assembly which may be fully enclosed by a sealed protective casing.

Another object is to provide a differential synchro assembly which may be connected to cooperating elements by means located entirely within the outside circumferential dimension of the casing of the differential assembly.

A further object of the invention is the provision of a differential synchro assembly readily adaptable to use with various types and sizes of gearing.

The exact nature of this invention as well as other objects and advantages thereof will be readily apparent from consideration of the following specification relating to the annexed drawing wherein:

Fig. 1 is a longitudinal sectional view taken on the axis of rotation of the rotatable elements within a preferred embodiment of the present invention, Fig. 2a shows a modified configuration for the left hand end of the embodiment as shown in Fig. 1 and Fig. 2b shows a modified configuration for the right hand end of the embodiment shown in Fig. 1.

Referring now to the drawings, wherein like reference characters designate like or corresponding parts throughout the several views, Fig. 1 shows a preferred embodiment including concentrically disposed frame member 11 and shaft 12 respectively supported by the bearings 13 and 14. The frame member 11 is generally cylindrical in shape and is arranged to support the stator element 15 upon its inner surface in the manner shown in Fig. 1. The shaft 12 is arranged to support the rotor element 16 in alignment with the stator element 15 as shown in Fig. 1. The shaft 12 has a projection 18 extending beyond the rotor element and supported in the bearing 19 in turn mounted centrally of supporting block 21 fixedly secured to the frame member 11. The supporting block 21 has a centrally disposed projection 22 comprising a stub shaft supported at its outer end by bearing 23. The working elements of this differential synchro assembly are fully enclosed by a casing comprising a generally cylindrical hollow shell closed at one end by an integral end portion arranged to support bearing 13 and closed at the other end by a removable end portion 26 arranged to support bearing 23. Five fixed electrical contacts 31, 32, 33, 34, and 35 for connection to external circuitry are fixedly secured to the end portion 26 and connected to brushes 39 which project within the casing for engagement with the slip rings 37 mounted in a series of concentric grooves in the insulated disc 38 fixedly secured to the stub shaft 22 for rotation therewith. The three electrical conductors 40 connected to a conventional synchro transmitter through three of the slip rings 37, three of the brushes 39, and the fixed contacts 31, 33 and 35 provide for excitation of the stator element by a three phase power input supplied by the synchro transmitter. The electrical conductors 43, including suitable brushes and wire leads, interconnecting the slip rings 44 and the fixed contacts 32 and 34, respectively, through two of the slip rings 37 and two of the brushes 39, provide for transmission of the single phase signal generated by the rotor to the fixed contacts 32 and 34. The stator element 15 and the rotor element 16 may be mechanically positioned angularly about their common axis of rotation by means of the adjacently disposed gears 41 and 42, respectively, gear 41 being fixedly secured to a hollow shaft projecting from the frame member 11 and gear 42 being fixedly secured to the projecting end of the shaft 12.

In installations where it is undesirable or impossible to use the embodiment of the instant invention with the gears 41 and 42 disposed closely adjacent to each other in the manner shown in Fig. 1, the present invention may be modified in the manner indicated in Figs. 2a and 2b by extending the stub shaft 22 through the outer surface of the end portion 26 to support the gear 41' in this location at the opposite end of the differential synchro assembly and hence relatively remote from the gear 42 which may then be mounted more closely adjacent to the casing 25 in the manner shown in Fig. 2a. In this latter arrangement the disposition and the relationship between the various elements located between the portions shown in Figs. 2a and 2b remains unchanged from the showing in Fig. 1 with respect to these elements.

In operation, the differential synchro assembly characterizing the instant invention may be arranged to function as a control device for high precision servo loops.

In such an installation, the stator element 11 is excited with the three phase power input supplied thereto by a conventional synchro transmitter in the manner described above. Simultaneously, the angular position of the stator element 15 is regulated mechanically by means in operative engagement with an externally disposed stator element positioning means represented in Fig. 1 by the gear 41. Meanwhile the rotor element 16 is independently angularly positioned by another externally disposed positioning means represented in Fig. 1 as gear 42. With the stator element and the rotor element wound in the conventional manner for differential synchro assemblies, the rotor output transmitted in the manner described above to the fixed contacts 32 and 34 will consist of a single phase signal proportional to the angular displacement of the rotor with respect to the stator, said signal indicating both the magnitude and the direction of this relative displacement.

The present invention provides an extremely compact arrangement of means for attaching externally disposed positioning means to the stator element and the rotor element respectively of a differential synchro assembly. In addition, the means for supporting the externally disposed positioning means will receive various different types and sizes of gears as necessary to provide various operating characteristics or to meet space limitations or other special requirements of various different installations in which this invention may be incorporated. Finally, the novel arrangement disclosed for independently rotatably supporting both the stator element and the rotor element of a differential synchro assembly makes possible the use of a fully enclosed and sealed casing for the assembly in order to completely exclude foreign matter from the working elements thereof.

Obviously many additional modifications and variations of the present invention are possible in the light of the above teachings. It is therefore to be understood that within the scope of the appended claims the invention may be practiced otherwise than as specifically described.

What is claimed is:

1. A compact fully enclosed differential synchro mechanism comprising a hollow generally cylindrical fixed non-rotatable case member having opposed end portions each having a centrally disposed recess therein at least one of which forms an opening through the case member, first and second bearing means mounted in the respective recesses of the respective end portions of said case member, a hollow generally cylindrical stator supporting frame closely interfitted within said case member and having opposed stub shafts projecting outwardly from its opposite ends at least one of which is hollow and both of which project into rotatable engagement with the first and second bearing means to rotatably support said stator supporting frame within the case member, a third bearing means mounted within the hollow stub shaft, a third recess in the stator supporting frame opposite to and in alignment with said hollow stub shaft, a fourth bearing means mounted in said third recess, an elongated rotor shaft rotatably supported in said third and fourth bearing means, a stator winding fixedly secured to the inner surface of said stator supporting frame, a rotor winding secured to said rotor shaft in alignment with said stator winding, a plurality of electrical connections fixedly secured to one end portion of the case member and projecting within the case member into engagement with a series of concentric circular sliding contacts mounted for rotation with the stator supporting frame, electrical conductors interconnecting a first plurality of said sliding contacts and the stator winding, a pair of slip rings mounted upon said rotor shaft, electrical conductors interconnecting said slip rings and a second plurality of the sliding contacts, said stator supporting frame and said rotor shaft being so disposed that one of the stub shafts projecting from the stator supporting frame and one end of the elongated rotor shaft project through at least one opening through the case member closed by the respective shafts and the bearing means therefor, a stator winding positioning means fixedly secured to the external portion of the stub shaft, and a rotor winding positioning means fixedly secured to the external portion of the rotor shaft, both of said positioning means having overall dimensions substantially less than the circumferential outer diameter of said case member.

2. A compact fully enclosed differential synchro mechanism comprising a hollow generally cylindrical fixed non-rotatable case member having opposed end portions each having a centrally disposed recess therein one of which forms an opening through the case member, first and second bearing means mounted in the respective recesses of the respective end portions of said case member, a hollow generally cylindrical stator supporting frame closely interfitted within said case member and having opposed stub shafts projecting outwardly from its opposite ends one of which is hollow and both of which project into rotatable engagement with the first and second bearing means to rotatably support said stator supporting frame within the case member, a third bearing means mounted within the hollow stub shaft, a third recess in the stator supporting frame opposite to and in alignment with said hollow stub shaft, a fourth bearing means mounted in said third recess, an elongated rotor shaft rotatably supported in said third and fourth bearing means, a stator winding fixedly secured to the inner surface of said stator supporting frame, a rotor winding secured to said rotor shaft in alignment with said stator winding, a plurality of electrical connections fixedly secured to one end portion of the case member and projecting within the case member into engagement with a series of concentric circular sliding contacts mounted for rotation with the stator supporting frame, electrical conductors interconnecting a first plurality of said sliding contacts and the stator winding, a pair of slip rings mounted upon said rotor shaft, electrical conductors interconnecting said slip rings and a second plurality of the sliding contacts, said stator supporting frame and said rotor shaft being so disposed within the case member that the hollow stub shaft projecting from the stator supporting frame and one end of the elongated rotor shaft extend through the opening through the case member with the projecting end of said rotor shaft located cencentric of and extended beyond the end of the hollow stub shaft, said shafts projecting through the opening and their respective bearing means together closing said opening, a stator winding positioning means fixedly secured to the external portion of the stub shaft, and a rotor winding positioning means fixedly secured to the external portion of the rotor shaft adjacent the stator winding positioning means, both of said positioning means having overall dimensions substantially less than the circumferential outer diameter of said case member.

3. A compact fully enclosed differential synchro mechanism comprising a hollow generally cylindrical fixed non-rotatable case member having opposed end portions each having a centrally disposed opening therethrough, first and second bearing means mounted in the respective openings through the respective end portions of said case member, a hollow generally cylindrical stator supporting frame closely interfitted within said case member and having opposed stub shafts projecting outwardly from its opposite ends one of which is hollow and both of which project into rotatable engagement with the first and second bearing means to rotatably support said stator supporting frame within the case member, a third bearing means mounted within the hollow stub shaft, a recess in the stator supporting frame opposite to and in alignment with said hollow stub shaft, a fourth bearing means mounted in said recess, an elongated rotor shaft rotatably supported in said third and fourth bearing means, a stator winding fixedly secured to the inner surface of said stator supporting frame, a rotor winding secured to said rotor shaft in alignment with said stator winding, a plurality of electrical connections fixedly secured to one end portion of the case member and projecting within the case member into engagement with a series of concentric circular sliding contacts mounted for rotation with the stator supporting frame, electrical conductors interconnecting a first plurality of said sliding contacts and the stator winding, a pair of slip rings mounted upon said rotor shaft, electrical conductors interconnecting said slip rings and a second plurality of the sliding contacts, said stator supporting frame and said rotor shaft being so disposed within the case member that one end of the elongated rotor shaft extends concentrically of the hollow stub shaft projecting from the stator supporting frame and through one opening through one end portion of said case member and the other stub shaft projecting from the other end of the stator supporting frame extends through the other opening through the other end portion of said case member, the shafts projecting through the respective openings and their respective bearing means closing said openings, a rotor winding positioning means fixedly secured to the external portion of the rotor shaft, and a stator winding positioning means fixedly secured to the external portion of the other stub shaft remote from the rotor winding positioning means, both of said positioning means having overall dimensions substantially less than the circumferential outer diameter of said case member.

References Cited in the file of this patent

UNITED STATES PATENTS

| | | |
|---|---|---|
| 557,384 | Hassler | Mar. 31, 1896 |
| 859,368 | Collins | July 9, 1907 |
| 1,533,242 | Fortescue | Apr. 14, 1925 |
| 2,153,523 | Roberts et al. | Apr. 4, 1939 |
| 2,388,955 | Couse | Nov. 13, 1945 |
| 2,526,669 | Kellogg et al. | Oct. 24, 1950 |

FOREIGN PATENTS

| | | |
|---|---|---|
| 556,387 | France | Apr. 11, 1923 |